(12) United States Patent
Higashitani et al.

(10) Patent No.: US 12,144,403 B2
(45) Date of Patent: Nov. 19, 2024

(54) FASTENER TAPE WOVEN FROM YARNS INCLUDING PLANT-DERIVED RESIN, FASTENER STRINGER AND METHOD OF PRODUCING THE SAME

(71) Applicant: YKK Corporation, Tokyo (JP)

(72) Inventors: Hiroki Higashitani, Toyama (JP); Mitsuo Tsuzuyama, Toyama (JP); Yuichi Miyazaki, Toyama (JP); Shinya Sakurai, Toyama (JP)

(73) Assignee: YKK Corporation, Tokyo (JP)

( * ) Notice: Subject to any disclaimer, the term of this patent is extended or adjusted under 35 U.S.C. 154(b) by 73 days.

(21) Appl. No.: 18/032,638

(22) PCT Filed: Nov. 2, 2020

(86) PCT No.: PCT/JP2020/041104
§ 371 (c)(1),
(2) Date: Apr. 19, 2023

(87) PCT Pub. No.: WO2022/091416
PCT Pub. Date: May 5, 2022

(65) Prior Publication Data
US 2023/0380552 A1 Nov. 30, 2023

(51) Int. Cl.
*A44B 19/54* (2006.01)
*A44B 19/34* (2006.01)
(Continued)

(52) U.S. Cl.
CPC .............. *A44B 19/54* (2013.01); *A44B 19/34* (2013.01); *B29D 5/00* (2013.01); *D03D 15/217* (2021.01); *D03D 15/50* (2021.01); *D10B 2401/04* (2013.01)

(58) Field of Classification Search
CPC ....... A44B 19/54; A44B 19/34; A44B 19/346; B29D 5/00; B29D 5/02; D03D 15/217;
(Continued)

(56) References Cited

U.S. PATENT DOCUMENTS 4,444,026 A * 4/1984 Matsuda .............. A44B 19/343
66/196
2002/0092139 A1 7/2002 Horikawa
(Continued)

FOREIGN PATENT DOCUMENTS

JP 11-124494 A 5/1999
JP 2002-209613 A 7/2002
(Continued)

OTHER PUBLICATIONS

International Preliminary Report on Patentability received in corresponding International Application No. PCT/JP2020/041104, mailed May 2, 2023, in 4 pages.
(Continued)

*Primary Examiner* — David M Upchurch
(74) *Attorney, Agent, or Firm* — Procopio, Cory, Hargreaves & Savitch LLP

(57) ABSTRACT

A fastener tape includes a first side-edge portion including a core cord and a plurality of first ground warp yarns; and a tape main portion adjacently positioned to the first side-edge portion and including a plurality of second ground warp yarns. A weft yarn and every ground warp yarn of the fastener tape are yarns including plant-derived resin. The first ground warp yarn is FDY (Fully Drawn Yarn) and the second ground warp yarn is DTY (Drawn Textured Yarn) and in accordance with this difference in yarn type, a thermal shrinkage ratio of the first ground warp yarn is greater than a thermal shrinkage ratio of the second ground warp yarn.

17 Claims, 6 Drawing Sheets

(51) Int. Cl.
*B29D 5/00* (2006.01)
*D03D 15/217* (2021.01)
*D03D 15/50* (2021.01)

(58) Field of Classification Search
CPC . D03D 15/50; D10B 2401/04; B29L 2005/00; B29C 45/14573
See application file for complete search history.

(56) References Cited

U.S. PATENT DOCUMENTS

2004/0173276 A1* 9/2004 Horikawa ............ A44B 19/346
139/384 B
2004/0231368 A1* 11/2004 Matsuda .............. A44B 19/343
66/195

FOREIGN PATENT DOCUMENTS

| JP | 2017-018327 A | 1/2017 |
| JP | 2018-102711 A | 7/2018 |
| WO | 2014/196082 A1 | 12/2014 |
| WO | 2017/168731 A1 | 10/2017 |

OTHER PUBLICATIONS

International Search Report (with translation) and Written Opinion received in corresponding International Application No. PCT/JP2020/041104, mailed Jan. 12, 2021, in 8 pages.

* cited by examiner

[Fig. 1]
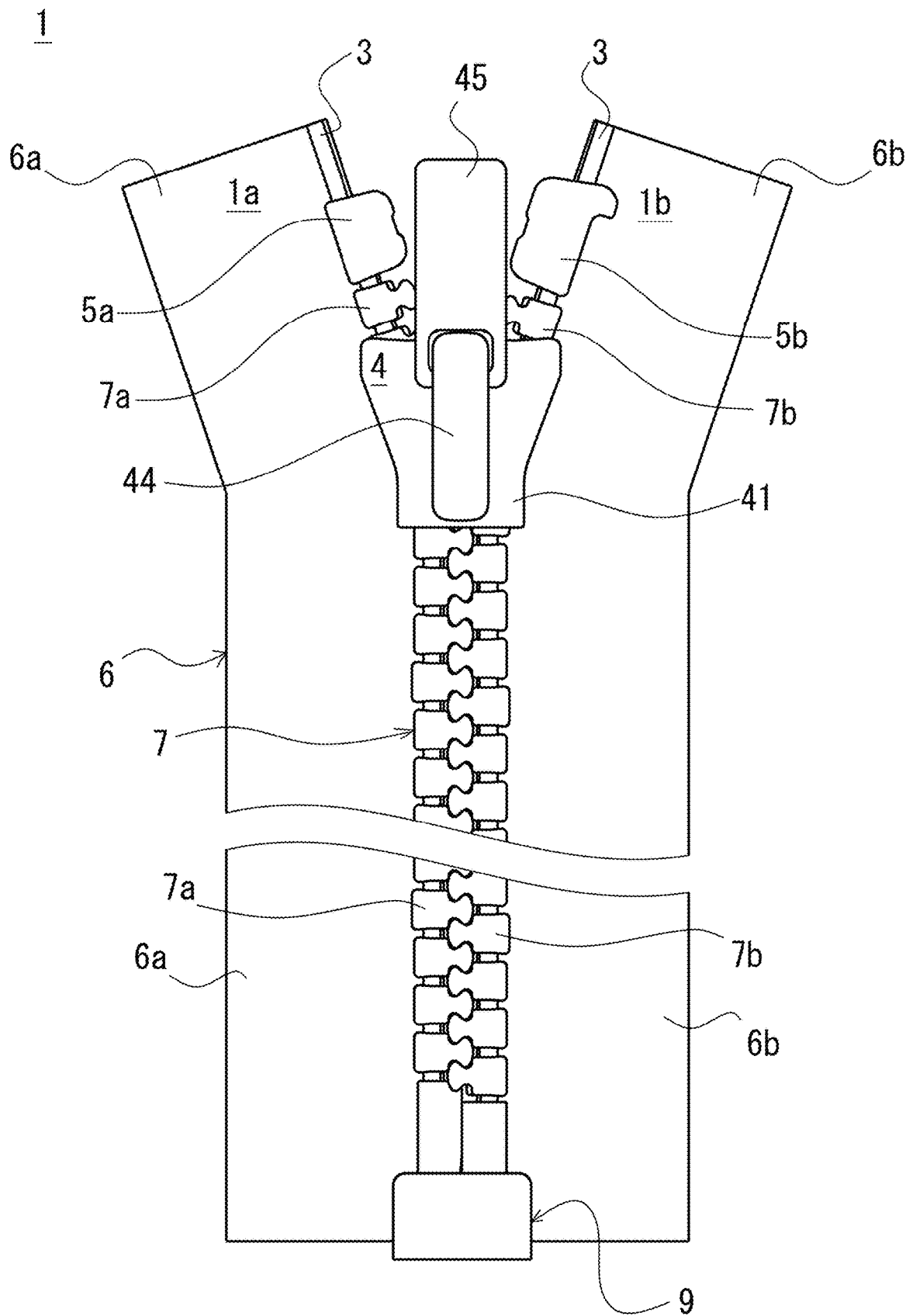

[Fig. 2]
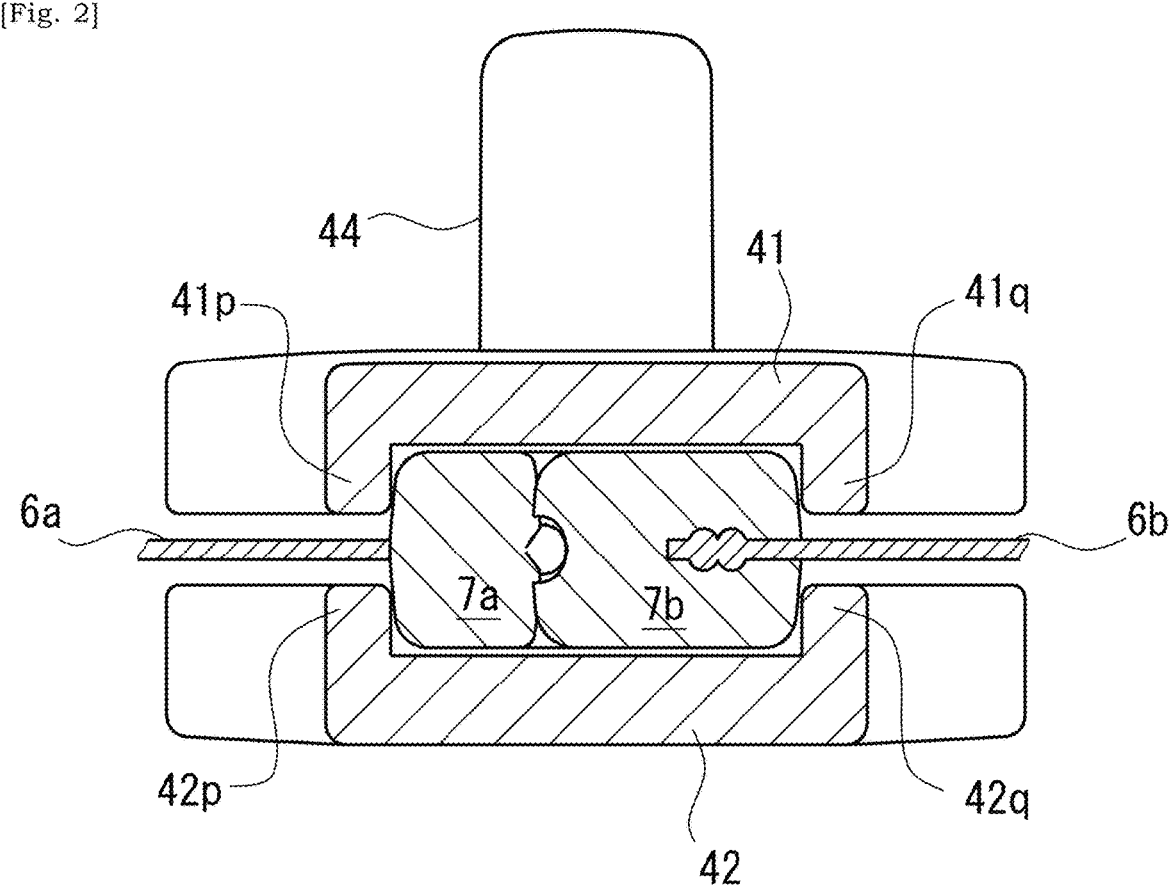
[Fig. 3]
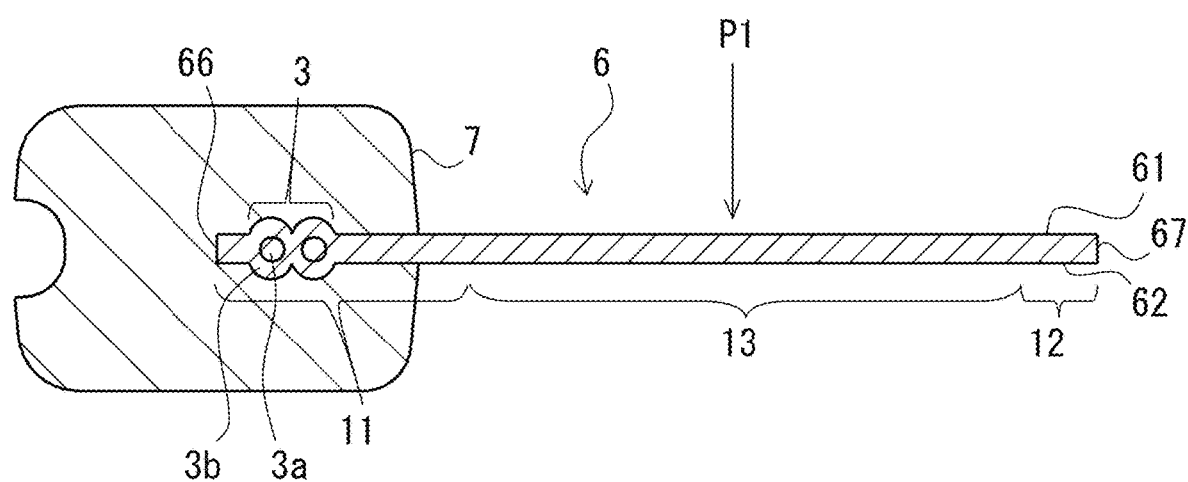

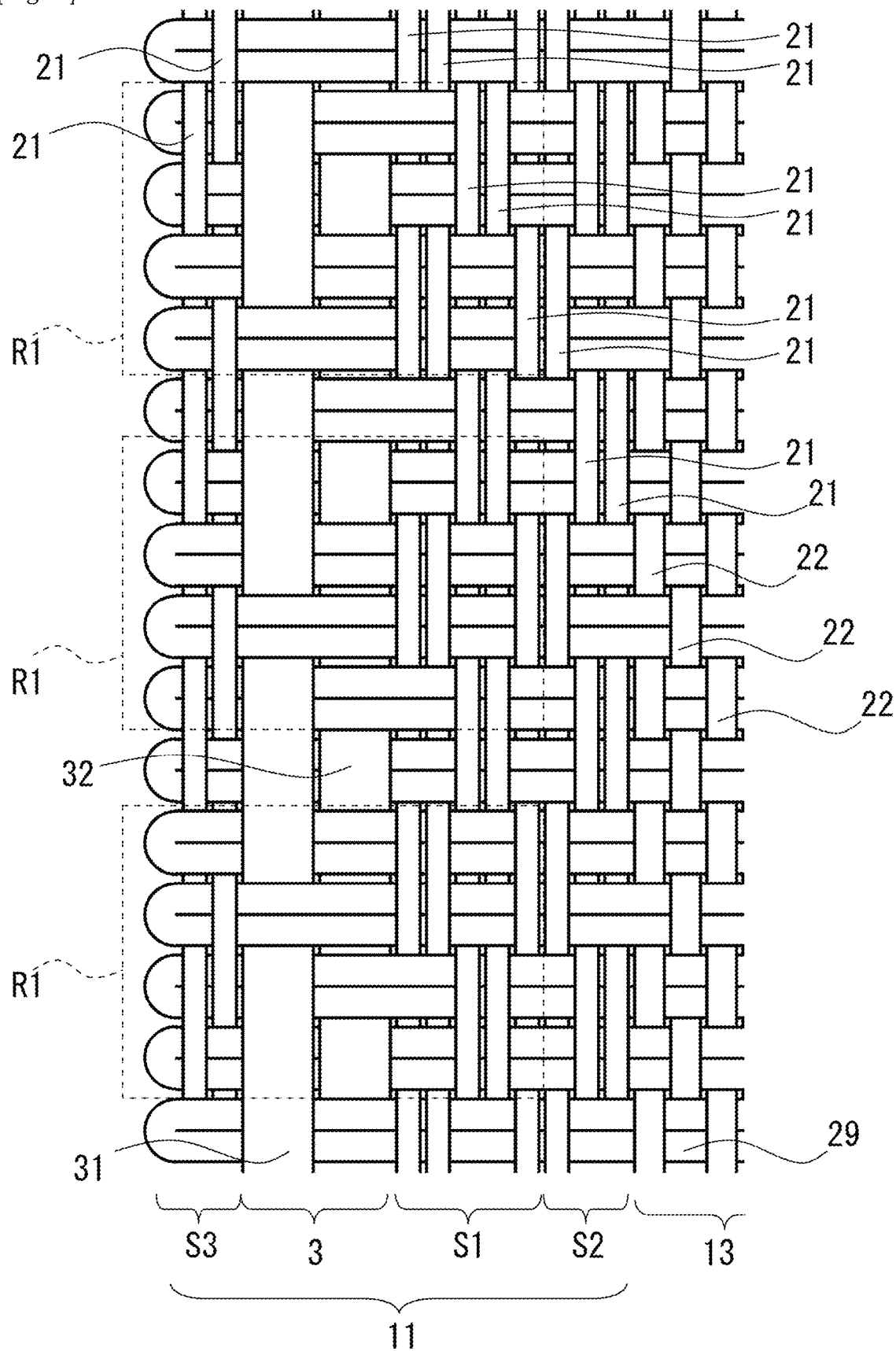
[Fig. 4]

[Fig. 5]
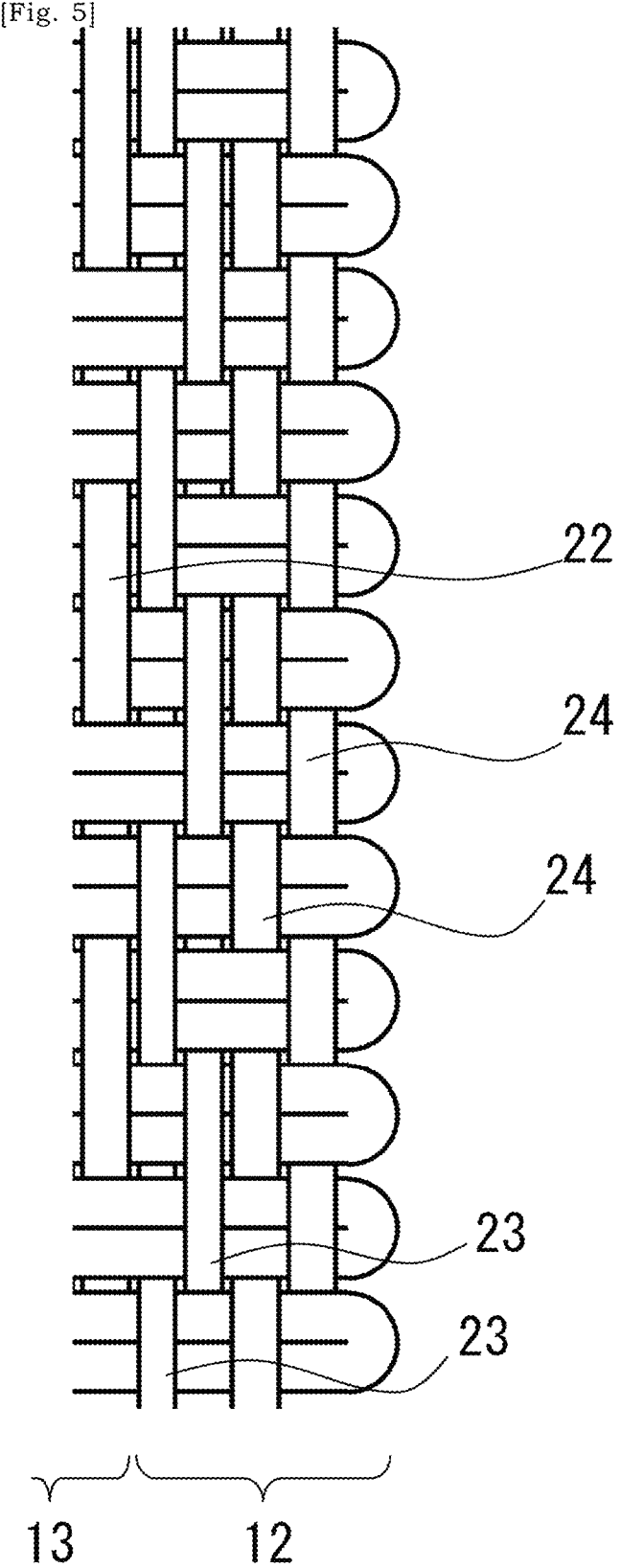

[Fig. 6]
(a) 
(b) 

[Fig. 7]
(a) 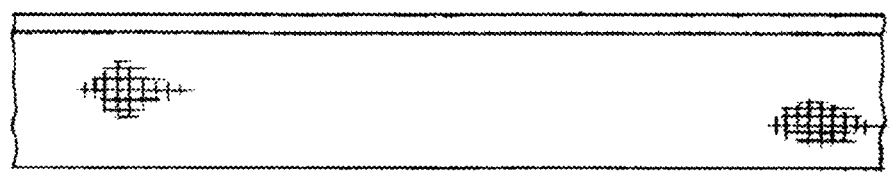
(b) 

FASTENER TAPE WOVEN FROM YARNS INCLUDING PLANT-DERIVED RESIN, FASTENER STRINGER AND METHOD OF PRODUCING THE SAME

CROSS-REFERENCE TO RELATED APPLICATIONS

This application is a US national stage application of International Application PCT/JP2020/041104, filed Nov. 2, 2020, the contents of which are incorporated by reference.

TECHNICAL FIELD

The present disclosure relates to a fastener tape woven from yarns including plant-derived resin and a fastener stringer including the fastener tape. The present disclosure also relates to a method of producing a fastener stringer.

BACKGROUND ART

In recent years, development of environmentally friendly products is strongly demanded in a field of slide fastener either. For example, patent literature 1 discloses a slide fastener suitable for recycling. In the patent literature 1, material of fiber-based parts consists of polyethylene terephthalate (PET) resin, and material of injection-molding-based parts consists of polyester resin other than the polyethylene terephthalate (PET) resin, and one of which is made of plant-derived resin.

Furthermore, with respect to a slide fastener, a phenomenon hereinafter referred to as "chain-puckering" may be caused, in a condition when the slide fastener is sewn onto a garment, such that the slide fastener (particularly an element-engaged portion formed by engaged left and right resin-made fastener elements) extends and meanders up and down along its elongation direction as shown in FIG. 6(a).

Patent literature 2 relates to an improvement of chain-puckering and discloses that a thermal shrinkage ratio of ground warp yarns (See reference code 6c and 6d in FIG. 1 of this literature) located adjacent to a core cord is designed to be greater than a thermal shrinkage ratio of ground warp yarns in a tape main portion and less than a thermal shrinkage ratio of the core cord, in order to apply a bias to the fastener tape through dyeing (See FIG. 7(b) of the present application). Every warp yarn fully shrinks during dyeing, particularly the core cord and the warp yarns shrink greatly, and resulting in the above-described bias-applied fastener tape (See Para. 0033 of the literature). It should be noted that the bias is exaggerated in FIG. 7(b) of this application relative to a bias-free condition (See FIG. 7(a)) for a purpose of facilitating reader's understanding.

Note that patent literature 3 discloses that ground warp yarns centrally located in a tape main portion are slackened to have a sag in the central region of the tape main portion. Patent literature 4 relates to a fastener tape for industry material in which a fastener tape is woven from FDYs (Fully Drawn Yarns).

CITATION LIST

Patent Literature

[PTL 1] International Publication No. 2017/168731
[PTL 2] Japanese patent application Laid-open No. 2002-209613
[PTL 3] Japanese patent application Laid-open No. 2018-102711
[PTL 4] Japanese patent No. 6143861

SUMMARY

Technical Problem

As described in the patent literature 2, it would also be preferred to apply a bias to the fastener tape based on a difference in thermal shrinkage ratio between ground warp yarns in a case where the fastener tape is woven from yarns including plant-derived resin. However, it would be yet not possible to say that the market scale of yarn including plant-derived-resin has expanded to be large enough, and there are fewer types of yarns including plant-derived resin available. So, the current situation does not allow easier procurement, as in the disclosure of the patent literature 2, of yarns which differ in the thermal shrinkage ratio (e.g. shrinkage ratio at water boiling temperature). Accordingly, if the technique disclosed in the patent literature 2 were applied to the fastener tape woven from yarns including plant-derived resin, one would select and use yarns with relatively higher thermal shrinkage ratio from types of yarns that do not include plant-derived resin. However, this selection may not be permitted from a purpose of weaving a fastener tape from yarns including plant-derived resin.

Then, there is an object for a fastener tape, a fastener stringer and a method of producing the same according to an aspect of the present disclosure to make an improvement of chain-puckering of slide fastener even in cases where a condition is imposed to use yarns including plant-derived resin.

Note that, in the patent literature 1, the stretch capability of the tape main portion is increased by reducing the weave density of a weft yarn and the stretch capability of the core cord is reduced by increasing the density in the core cord (para. 0039). This ensures that, while the fastener tape is dyed, the core cord does not elongate compared with the tape main portion. However, there are cases where reduction of weave density in the tape main portion is not permissible. Therefore, it would be meaningful to provide a technique that contributes for bias adjustment of fastener tape in a different approach than the method of the patent literature 1.

Solution to Problem

A fastener tape according to an aspect of the present disclosure includes a first side-edge portion including a core cord and a plurality of first ground warp yarns; and a tape main portion adjacently positioned to the first side-edge portion and including a plurality of second ground warp yarns. A weft yarn and every ground warp yarn of the fastener tape are yarns including plant-derived resin. The first ground warp yarns are FDY (Fully Drawn Yarn) and the second ground warp yarns are DTY (Drawn Textured Yarn). In accordance with this difference in yarn type, a thermal shrinkage ratio of the first ground warp yarn is greater than a thermal shrinkage ratio of the second ground warp yarn.

In some embodiments, the FDY (Fully Drawn Yarn) and the DTY (Drawn Textured Yarn) are ones secondary processed from yarns of same composition. In other words, the composition of the first ground warp yarn and the composition of the second ground warp yarn are same. Embodiments are envisioned where the compositions of component yarns of the fastener tape (i.e. a weft yarn, a core cord, and every ground warp yarn) are same.

In some embodiments, 0.5<(T2/T1)<0.8 is satisfied, where T1 indicates the thermal shrinkage ratio of the first ground warp yarn in percent and T2 indicates the thermal shrinkage ratio of the second ground warp yarn in percent.

In some embodiments, the plurality of first ground warp yarns includes a first subset and a second subset, the first subset including P (P indicating a natural number equal to or greater than 3) yarns of the first ground warp yarns and located in a region closer to the tape main portion than the core cord, and the second subset including Q (Q indicating a natural number less than said P) yarns of the first ground warp yarns and located in a region closer to the tape main portion than the first subset. The first subset is arranged to cross regions to which resin-made fastener elements adhere, and the second subset is interposed between said regions and the tape main portion. P may indicate a natural number equal to or greater than 4, and Q may indicate a natural number equal to or less than 3.

In some embodiments, the plurality of first ground warp yarns includes a third subset including R (R indicating a natural number less than said P) yarns of the first ground warp yarns and located in a region farther from the tape main portion than the core cord.

In some embodiments, the first side-edge portion includes no DTY (Drawn Textured Yarn).

In some embodiments, the core cord includes a FDY (Fully Drawn Yarn) including plant-derived resin. The composition of a component yarn of the core cord may be same as the composition of the first ground warp yarn (FDY).

In some embodiments, the core cord includes one or more core yarns and a plurality of sheath yarns forming a sheath layer to cover the one or more core yarns, both of the core yarn and the sheath yarn being FDY (Fully Drawn Yarn) including plant-derived resin. The composition of the core yarn and the composition of the sheath yarn may be same as the composition of the first ground warp yarn (FDY).

In some embodiments, further provided is a second side-edge portion arranged opposite to the first side-edge portion, the second side-edge portion including a plurality of third ground warp yarns, each of the plurality of third ground warp yarns being FDY (Fully Drawn Yarn) including plant-derived resin. The composition of the third ground warp yarn may be same as the composition of the first ground warp yarn (FDY).

A fastener stringer according to another aspect of the present disclosure is a fastener stringer (1a, 1b) that includes a fastener tape of any one of above-described ones, a plurality of fastener elements attached to the first side-edge portion. A number of the first ground warp yarn with which the respective fastener elements are in contact is equal to or greater than 6. The fastener element may be a resin-made fastener element.

A method of producing a fastener stringer according to yet another aspect of the present disclosure is one that includes weaving a fastener tape; thermally processing the fastener tape; and performing injection-molding of resin-made fastener elements to the thermally-processed fastener tape, wherein the fastener tape is a faster tape in which a weft yarn and every ground warp yarn are yarns including plant-derived resin; the fastener tape comprises a first side-edge portion including a core cord and a plurality of first ground warp yarns, and a tape main portion adjacently positioned to the first side-edge portion and including a plurality of second ground warp yarns; and when the fastener tape is thermally processed, the first ground warp yarn shrinks more than the second ground warp yarn in accordance a difference in yarn type between the first ground warp yarn and the second ground warp yarn, the first ground warp yarn being FDY (Fully Drawn Yarn) and the second ground warp yarn being DTY (Drawn Textured Yarn).

In some embodiments, the above-described method further includes obtaining the FDY and the DTY through different secondary processes to a common material of POY (Partially Oriented Yarn). The POY is drawn to produce the FDY. The POY is false-twisted to produce the DTY.

The features of fastener tape discussed above or below would similarly apply to the method of producing a fastener tape, and thus overlapping descriptions are omitted.

Advantageous Effects of Invention

An aspect of the present disclosure allows to supply a fastener tape, a fastener stringer and a method of producing the same which improve a chain-puckering of slide fastener even in a case where a condition is imposed to use yarns including plant-derived resin.

BRIEF DESCRIPTION OF DRAWINGS

FIG. 1 is a schematic top view of a slide fastener according to an aspect of the present disclosure.

FIG. 2 is a schematic diagram illustrating a configuration of slider.

FIG. 3 is a schematic cross-sectional view illustrating a configuration of a fastener stringer.

FIG. 4 is a schematic diagram illustrating a tape structure of a first side-edge portion and an adjacent part of a tape main portion in a fastener tape.

FIG. 5 is a schematic diagram illustrating a tape structure of a second side-edge portion and an adjacent part of a tape main portion in the fastener tape.

FIG. 6 (*a*) is a photograph showing a state in which a slide fastener of a comparative example is sewn to an opening of a garment. FIG. 6(*b*) is a photograph showing a state in which a slide fastener of a working example is sewn to an opening of a garment.

FIG. 7 (*a*) is a schematic diagram showing a state in which a fastener tape extends straight in its elongation direction. FIG. 7 (*b*) is a schematic diagram exaggeratedly showing a state in which a bias is applied to a fastener tape and a first side-edge portion thereof is curved like a concave.

DESCRIPTION OF EMBODIMENTS

Hereinafter, various embodiments and features will be described with reference to drawings. A skilled person would be able to combine respective embodiments and/or respective features without requiring excess description, and would appreciate synergistic effects of such combinations. Overlapping description among the embodiments are basically omitted. Referenced drawings aim mainly for describing inventions and are simplified for the sake of convenience of illustration. The respective features should be appreciated as universal features not only effective to a fastener tape presently disclosed but also effective to other various fastener tapes not disclosed in the present specification.

In the present specification, Front-rear direction matches a direction (up-down direction when FIG. 1 is viewed in front) in which a slider 4 moves so as to open and close a slide fastener 1. Left-right direction is a direction (left-right direction when FIG. 1 is viewed in front) orthogonal to the front-rear direction and parallel to a tape surface of a fastener tape. Up-down direction is a direction (paper-thickness direction of FIG. 1) orthogonal to the front-rear direction and perpendicular to a tape surface of the fastener tape. The tape surface of the fastener tape is a surface for defining a thickness of the fastener tape.

Slide fastener 1 shown in FIG. 1 is a belt-like member elongated in the front-rear direction and having a narrow width in the left-right direction, and has a pair of left and right fastener stringers 1a and 1b, and a slider 4 mounted for coupling and decoupling these fastener stringers 1a and 1b. Each of the fastener stringers 1a and 1b has a fastener tape 6a,6b and a plurality of resin-made fastener elements 7a,7b adhered to an opposing side-edge portion (a first side-edge portion described below) of the fastener tape 6a,6b. As the slider 4 moves frontward, the resin-made fastener elements 7a and 7b at the left and right sides engage with one another. As the slider 4 moves rearward, the resin-made fastener elements 7a and 7b at the left and right sides are disengaged. Note that, the slide fastener 1 is provided with front stops 5a and 5b and rear stop 9 which are arranged to prevent the slider 4 from moving forward and rearward respectively.

As shown in FIGS. 1 and 2, the slider 4 has a top wing 41, a bottom wing 42 and a coupling pillar (not illustrated) that interconnects the top wing 41 and the bottom wing 42. Y-shaped element passage is provided in the slider 4. In more detail, the coupling pillar is positioned in a front end portion of the slider 4, and front mouths are arranged at the left and right sides of the coupling pillar. One rear mouth is arranged at a rear end portion of the slider 4. The left and right disengaged resin-made fastener elements 7a and 7b enter into the slider 4 via the left and right front mouths, are engaged at a rear side of the coupling pillar in the slider 4, and this exits through the rear mouth. The left and right engaged resin-made fastener elements 7a and 7b enter into the slider 4 via the rear mouth, are disengaged by the coupling pillar in the slider 4, and the disengaged resin-made fastener elements 7a and 7b exit from the front mouths respectively. Note that, the resin-made fastener elements 7a and 7b may be simply referred to as resin-made fastener element 7 without distinguishing them. The same applies to the fastener tapes 6a and 6b.

The top wing 41 is provided with downwardly protruding left and right flanges 41p and 41q on its left and right side-edges. Additionally or alternatively to this, the bottom wing 42 is provided with upwardly protruding left and right flanges 42p and 42q on its left and right side-edges. Arrangement of the flanges 41p,41q and/or 42p,42q allows more stable movement of resin-made fastener element in the slider 4.

The fastener tape 6 is a woven fabric woven from a multiplicity of ground warp yarns and one weft yarn, and is elongated in the front-rear direction with a constant width in the left-right direction. The fastener tape 6 has a tape top surface 61 and a tape bottom surface 62, and has a thickness defined by these surfaces 61 and 62 (See FIG. 3). The tape top surface and the bottom surface present a pattern in accordance with a woven structure of the ground warp yarns and the weft yarn. The fastener tape 6 has a first end surface 66 and a second end surface 67. The first and second end surfaces 66 and 67 are formed as a non-flat surface structured by continuous arrangement, along the tape-elongation direction, of reversed portions at which the direction of travel of the weft yarn is reversed.

The weft yarn and all of the ground warp yarns in the fastener tape 6 are yarns including plant-derived resin. In some cases, the weft yarn and all of the ground warp yarns in the fastener tape 6 are yarns including plant-derived resin and made of same composition. Ratio of the plant-derived resin in a yarn may be 30% by mass or more for example, but should not be limited to this. The component yarn (core yarn and/or sheath yarn) of the core cord is a yarn including plant-derived resin, and preferably a yarn made of same composition as the weft yarn and the ground warp yarn. Polymer may be used as the plant-derived resin which is generated based on condensation and polymerization reaction of biomass-derived ethylene glycol and terephthalic acid. The biomass-derived ethylene glycol can be produced, by a known method, from biomass-derived ethanol obtained from sugarcanes. The terephthalic acid can be produced by a known method from oil material.

The fastener tape 6 has a first side-edge portion 11 in which the core cord 3 is arranged, a tape main portion 13 arranged adjacently to the first side-edge portion 11, and a second side-edge portion 12 arranged adjacently to the tape main portion 13 at the opposite side to the first side-edge portion 11. The tape main portion 13 is interposed and sandwiched between the first side-edge portion 11 and the second side-edge portion 12. The first side-edge portion 11 is a side-edge portion sided to which the resin-made fastener elements 7 adhere. The second side-edge portion 12 is a side-edge portion located at the opposite side to the first side-edge portion 11 in the left-right direction or the tape width direction.

The tape main portion 13 is overlaid onto a fabric of a garment and they are sewn together by sewing yarn(s). For example, the fastener tape 6 is sewn to a fabric of a garment by sewing yarn(s) at a sewing position P1 shown in FIG. 3. It should be noted that a boundary between the first side-edge portion 11 and the tape main portion 13 is defined by a boundary between the plurality of first ground warp yarns 21 (e.g. a second subset S2) in the first side-edge portion 11 and the plurality of second ground warp yarns 22 in the tape main portion 13, as shown in FIG. 4. A boundary between the tape main portion 13 and the second side-edge portion 12 is defined by a boundary between the plurality of third ground warp yarns 23 in the second side-edge portion 12 and the plurality of second ground warp yarns 22 in the tape main portion 13, as shown in FIG. 5.

The resin-made fastener elements 7 are injection-molded elements to be a predetermined shape including a resin portion adhered to the first side-edge portion 11 of the fastener tape 6 through injection molding. Typically, the resin-made fastener element 7 has a base portion, a neck and a head in a direction away from the tape main portion 13 toward the first side-edge portion 11. The base portion adheres to the first side-edge portion 11 (particularly to the core cord 3). The neck and the head are arranged externally of the fastener tape 6. The neck is narrower in width (in the front-rear direction) than the base portion and the head. When the left and right resin-made fastener elements 7 are engaged, the head of the resin-made fastener element in one of the fastener stringers is interposed between the necks of a pair of resin-made fastener elements adjacently arranged in the other one of the fastener stringers. It should be noted that the shape of resin-made fastener element is not limited to the illustrated one and each resin-made fastener element could be shaped like an inversed-V. It should also be noted that, in the present embodiment, the fastener elements are made of resin but it could be made of metal.

The resin-made fastener element may include plant-derived resin. For example, the resin-made fastener element is made of a thermoplastic resin selected from a group consisting of polytrimethylene terephthalate (PTT), polybutylene terephthalate (PBT), polyethylene naphthalate (PEN), polybutylene naphthalate (PBN) and a combination thereof.

Likewise the component yarns of the fastener tape 6, the thermoplastic resin of the resin-made fastener element may be a plant-derived resin. The plant-derived resin can be distinguished from non-plant-derived resin (e.g. oil-derived resin) using various component/ingredient analysis (e.g. a nuclear magnetic resonance apparatus based analysis). In some cases, an indication is given to plant-derived-resin-based products to certify that its material is derived from plant. In such an instance, it would be possible to determine that the material is derived from plant based on the indication.

Just for a caution, a type of slide fastener should not be limited to one illustrated in FIG. 1. For example, a conceal slide fastener can be employed. In such a case, a slider designed for the conceal slide fastener would be used. Furthermore, a tape-folded portion is formed in the fastener tape at a position closer to the side-edge portion (the first-side edge portion described below) to which the resin-made fastener elements adhere.

The fastener tape is automatically woven by setting ground warp yarns and a weft yarn in an automatic loom and operating the automatic loom. It is well known in this technical field to produce a fastener tape using an automatic loom, thus detail descriptions would be omitted. The fastener tape would be thermally processed at least one time after the production by the automatic loom. For example, after the production by the automatic loom, the fastener tape is heated in a process of heat setting, and is soaked in a dyeing solution at a high temperature in a process of dyeing. The ground warp yarns and the weft yarn of the fastener tape would fully shrink by heat as having been heated through the series of processes. Note that, only one of the heat setting and the dyeing may be selectively performed. With respect to the dyeing, an ink-jet printer can be used to partially or wholly color the fastener tape.

The fastener tape is processed through at least one thermal process and then transferred to a process of injection molding. In the process of injection molding, the fastener tape is sandwiched between a lower mold and an upper mold, and the first side-edge portion is arranged in a molding cavity that is defined by the upper and lower molds. Molten resin is supplied to the molding cavity and then solidified so that the resin-made fastener elements adhere to the first side-edge portion of the fastener tape. Apparatus and method of injection molding for resin-made fastener elements are well known in this technical field, and thus detail descriptions are omitted. The ground warp yarns and the weft yarn in the fastener tape have been fully shrunk by heat in advance of the process of injection molding, and thus they do not shrink further by heat during the process of injection molding or the degree would be small if any.

Further descriptions will be made with reference to FIGS. 4 and 5. The first side-edge portion 11 has, as the core cord 3, a pair of two core cords 31 and 32 adjacently arranged at the left and right sides. The first side-edge portion 11 further has a plurality of first ground warp yarns 21 (10 yarns in total, for example) additionally to the core cord 3. The tape main portion 13 has a plurality of second ground warp yarns 22 which are separate yarns from the first ground warp yarns 21. The second side-edge portion 12 has a plurality of third ground warp yarns 23 which are separate yarns from the second ground warp yarns 22, and a plurality of fourth ground warp yarns 24 which are separate yarns from the third ground warp yarns 23. Yarn having a same characteristic as that of the first ground warp yarn 21 may be used for the third ground warp yarn 23. Yarn having a same characteristic as that of the second ground warp yarn 22 may be used for the fourth ground warp yarn 24. In connection to the number of ground warp yarn, the following condition would be satisfied: Number of second ground warp yarn 22>Number of first ground warp yarn 21>Number of third ground warp yarn 23.

Every yarn of the ground warp yarns and the weft yarn included in the fastener tape 6 are multifilament yarns including biomass-derived polyester (a bundle of filaments consisting of biomass-derived polyester). Similarly, the core cord is structured from a bundle of multifilament yarn including biomass-derived polyester (a bundle of filaments consisting of biomass-derived polyester). The type of filament included in respective one yarn should not be limited to one but it may be two or more. That is, each one yarn can include different filaments produced from different resins through spinning.

Polyethylene terephthalate (PET) can be named as the biomass-derived polyester. PET is a polymer having essential components of terephthalic acid as acid component and ethylene glycol as diol component in its repeating unit. Both of the acid component and the diol component may include copolymer component but, the terephthalic acid as the acid component and the ethylene glycol as the diol component would be 80 mole % or more, preferably 90 mole % or more, still further 95 mole % or more, or most preferably 100 mole % respectively in the acid component and the diol component.

With respect to the copolymer component used in the PET resin, aromatic dicarboxylic acids such as isophthalic acid, 2,6-naphthalenedicarboxylic acid, 1,5-naphthalenedicarboxylic acid, and 2,7-naphthalenedicarboxylic acid and so on; aliphatic dicarboxylic acids such as adipic acid, sebacic acid, decanedicarboxylic acid and so on; or ester-forming derivatives of these components such as alkyl esters and acid halides and so on can be named as acid component. Low-molecular-weight diols such as trimethylene glycol, tetramethylene glycol, hexamethylene glycol, diethylene glycol, cyclohexanedimethanol, cyclohexanediol, 1,4-bisoxyethoxybenzene, bisphenol A and so on; polymeric diols such as polyethylene glycol, polytetramethylene glycol, polyhexamethylene glycol and so on; or ester-forming derivatives of these components and so on can be named as the diol component. These acid and diol components may be combined respectively. Furthermore, plural types of PET resins of different compositions may be combined and used.

The weft yarn 29 repeats to extend leftward and rightward alternately in the total width of the first side-edge portion 11, the tape main portion 13 and the second side-edge portion 12. The direction of travel of the weft yarn 29 is reversed in the first and second side-edge portions 11 and 12, forming a continuous arrangement of reversed portions thereof along the tape-elongation direction. The weft yarn 29 is a multifilament yarn that is a bundle of filaments made of plant-derived resin as described above, ensuring desired bulkiness, texture, and low-reflectivity of the tape main portion 13. The weft yarn 29 is a DTY (Drawn Textured Yarn) including plant-derived resin, and each filament in the weft yarn 29 is produced through processes of spinning, drawing and false-twisting.

In the present embodiment, the first ground warp yarns 21 are FDYs (Fully Drawn Yarns) and the second ground warp yarns 22 are DTYs (Drawn Textured Yarns). Both of the first and second ground warp yarns 21 and 22 include plant-derived resin. In accordance with this difference in yarn type between the first and second ground warp yarns 21 and 22, the thermal shrinkage ratio of the first ground warp yarn 21 is greater than the thermal shrinkage ratio of the second ground warp yarn 22. Therefore, the first side-edge portion 11 becomes shorter than the tape main portion 13 in the tape-elongation direction during the thermal process of the fastener tape woven by automatic loom. In such a way, the resulting effect of stretching the first side-edge portion 11 during a process of injection molding would be reduced. That is, even if the first side-edge portion 11 is stretched in the tape-elongation direction during the process of injection molding, the first side-edge portion 11 is shrunk and shortened in advance and that effect is reduced.

In more detail, the first side-edge portion of the fastener tape is placed onto a lower die while being stretched along the tape-elongation direction and is sandwiched between the lower die and an upper die during the process of injection molding. Moreover, it would be subjected to heat largely as the upper and lower dies are heated up to a higher temperature when molten resin is supplied and are subsequently cooled. As a result, the first side-edge portion 11 tends to retain the stretched condition along the tape-elongation direction and to be slightly longer along the tape-elongation direction. The chain-puckering described above may be caused if such a fastener stringer is used to produce a slide fastener and this is sewn to a garment. In the present embodiment, while using the ground warp yarns including plant-derived resin, the FDY and DTY are respectively allocated to the first side-edge portion 11 and the tape main portion 13 in which the FDY and the DTY are different in thermal shrinkage ratio owing to different production methods. This allows to supply improved fastener tapes, fastener stringers and slide fasteners in connection to the chain-puckering of slide fastener while satisfying the condition of the use of yarn including plant-derived resin. Note that, the false-twisting indicates a process to form bulges in a yarn such as a process of twisting a yarn, applying heat to the yarn, and subsequently untwisting the yarn. DTY has bulges and interlace portions alternately in its elongation direction. FDY extends with substantially a constant cross-sectional area in its elongation direction.

Difference in the thermal shrinkage ratio between the first ground warp yarn 21 (FDY) and the second ground warp yarn 22 (DTY) may be caused in accordance with different secondary processes applied to yarns that are same at least in composition. In some cases, each of the above-described FDY and DTY is obtained through a secondary process of a POY (Partially Oriented Yarn) having a certain composition. That is, the POY having a certain composition is processed through additional drawing to be the FDY and in contrast, the POY having the certain composition will be the DTY through a process of false-twisting. Yarns with the same composition are used for obtaining yarns with different thermal shrinkage ratios, thus avoiding procurement of yarns with different compositions and facilitating reduction of material cost. Note that, yarns which are same in thickness and/or number of filament additionally to composition can be used, thus facilitating further reduction of material cost. Note that, if yarns are same in composition, they will be same also in % by mass of plant-derived resin included in each yarn. Yarns which are same at least in composition as appreciated from the above description may be ones reeled out from a same reel, but should not be limited to this.

There is a social demand to configure more portions from yarns including plant-derived resin responsive to recent increasing social awareness on environment and strict environmental regulations in the apparel industry. Particularly in a case when a weft yarn and all ground warp yarns include plant-derived resin in a fastener tape, a yarn containing no plant-derived resin cannot be used for a higher shrinking portion in the fastener tape and a measure against the chain-puckering may possibly be insufficient. There may be a technically selectable option to request a yarn-manufacturer to produce dedicated several types of yarns which are different in thermal shrinkage ratio based on modification of composition, thickness, thermal shrinkage ratio (e.g. shrinkage ratio at water boiling temperature) or the like. However, if the procurement of just a small amount and magnitude in the total consumption of fastener tape of slide fastener were ordered dedicatedly to a yarn-manufacturer, this would result in increased cost.

In some cases, the FDY and the DTY are ones respectively obtained through secondary processes of yarns which are same in composition. This avoids the procurement of yarns with different compositions for obtaining yarns with different thermal shrinkage ratios, thus facilitating reduction of material cost. This is particularly advantageous for plant-derived yarns with lesser selectable types.

Normally, DTYs are used as the ground warp yarns of fastener tape from a view point of bulkiness, tactile sense, and low-reflectivity. There is a rare case where FDYs are used as the ground warp yarns of fastener tape when a higher-robustness is required. This is because the FDYs are produced without false-twisting after spinning and drawing and the yarn characteristic based on false-twisting (e.g. bulkiness, properties for dyeing, low-reflectivity) is not obtained.

The FDYs are introduced selectively to the first side-edge portion 11 in the tape width of the first side-edge portion 11 and the tape main portion 13 (i.e. it is not introduced to the tape main portion 13). The DTYs are used as ground warp yarn in the tape main portion 13 and the characteristics based on the false-twisting (e.g. bulkiness, properties for dyeing, low-reflectivity) are ensured. In such a manner, sacrifice of yarn characteristic based on false-twisting (e.g. bulkiness, low-reflectivity) can be minimized even though the FDYs are used as ground warp yarns. Moreover, an uneven color area possibly formed in the fastener tape in accordance with a difference in property of dyeing between FDY and DTY would be reduced. Note that, the introduction of FDYs in the first side-edge portion 11 allows increased strength of the first side-edge portion 11. The increase in yarn strength nearby the slider 4 may be effective for suppression of wear due to contact with the slider 4.

As a method of calculation of thermal shrinkage ratio, HS (dry heat shrinkage) and BS (boiled water shrinkage) tests based on JIS-L-1013 8.18 would be used. The condition of the HS test would be 180° C. and 30 minutes. The condition of the BS test would be 100° C. and 30 minutes.

In the present embodiment, the thermal shrinkage ratio of the first ground warp yarn 21 in the first side-edge portion 11 is relatively greater but not extremely greater than the thermal shrinkage ratio of the second ground warp yarn 22 in the tape main portion 13. This is because both of the first ground warp yarn 21 and the second ground warp yarn 22 are yarns including plant-derived resin and it is difficult to allocate different yarns to them respectively for a purpose of increasing a difference in the thermal shrinkage ratio. Therefore, $0.5<(T2/T1)<0.8$ would be satisfied where T1 indicates a thermal shrinkage ratio of the first ground warp yarn 21 in percent and T2 indicates a thermal shrinkage ratio of the second ground warp yarn 22 in percent. Note that this ratio between the thermal shrinkage ratios would be calculated based on thermal shrinkage ratios presented by a yarn manufacturer (manufacturing company of yarn) as a characteristic of yarn. This ratio between the thermal shrinkage ratios would be evaluated after a fastener tape is woven and before the fastener tape is thermally processed. In some cases, the thermal shrinkage ratio of the first ground warp yarn 21 of the first side-edge portion 11 is in a range from 8.4% to 11.2%, and the thermal shrinkage ratio of the second ground warp yarn 22 is in a range from 5.5% to 6.5%. The strength of the first ground warp yarn 21 in the first side-edge portion 11 is greater than the strength of the second ground warp yarn 22 in the tape main portion 13. $0.65<(Z2/Z1)<0.84$ would be satisfied where Z1 indicates a strength of the first ground warp yarn 21 in cN/T and Z2 indicates a strength of the second ground warp yarn 22 in cN/T. Note that this ratio between the strengths would be calculated based on strengths presented by a yarn manufacturer (manufacturing company of yarn) as a characteristic of yarn. This ratio between the strengths would be evaluated after a fastener tape is woven and before the fastener tape is thermally processed. In some cases, the strength of the first ground warp yarn 21 is in a range from 5.0 cN/T to 6.0 cN/T, and the strength of the second ground warp yarn 22 is in a range from 4.0 cN/T to 4.2 cN/T.

In some cases, the thickness (maximum cross-sectional area) of the first ground warp yarn 21 is less than the thickness (maximum cross-sectional area) of the second ground warp yarn 22. The thickness of yarn is in accordance with denier and/or number of filament and/or secondary process. $1.0<(V2/V1)<1.5$ would be satisfied where V1 indicates a denier of the first ground warp yarn 21 and V2 indicates a denier of the second ground warp yarn 22. It is facilitated by adjustment of V2/V1 to apply an appropriate bias to a fastener tape. In some cases, a denier of the first ground warp yarn 21 is 250 dtex, and a denier of the second ground warp yarn 22 is 330 dtex. The first ground warp yarn 21 and the second ground warp yarn 22 are multifilament yarns as described above. $J1<J2$ or $1.5<(J2/J1)<2.5$ would be satisfied where J1 indicates a number of filament per a first ground warp yarn 21 and J2 indicates a number of filament per a second ground warp yarn 22. In some cases, the number of filament per a first ground warp yarn 21 is 48 and the number of filament per a second ground warp yarn 22 is 96.

Further detail description will follow with reference to FIG. 4. The plurality of first ground warp yarns 21 includes, in a region closer to the tape main portion 13 than the core cord 3, a first subset S1 of P (P indicating a natural number equal to or greater than 3) yarns of the first ground warp yarns 21; and a second subset S2 of Q (Q indicating a natural number less than said P) yarns of the first ground warp yarns 21 arranged closer to the tape main portion 13 than the first subset S1. The first subset S1 is arranged to cross regions R1 to which the resin-made fastener elements adhere. The second subset S2 is arranged between the tape main portion 13 and the regions R1 to which the resin-made fastener elements adhere (i.e. the second subset S2 is arranged in a position to which the resin-made fastener elements do not adhere). In such a case, a sufficient number of the first ground warp yarns 21 is arranged, facilitating that a sufficient amount of thermal shrinkage of the first side-edge portion 11 is ensured relative to the tape main portion 13. Note that $Q<P$ would be satisfied, reducing the influence of introduction of FDY. That is, Q yarns of FDY are prevented from exposure as covered by the resin-made fastener elements. P yarns of FDY are inconspicuous as positioned near the resin-made fastener elements.

In some cases, P indicates a natural number equal to or greater than 4, and Q indicates a natural number equal to or less than 3 ($Q<P$ is satisfied as a precondition). Furthermore, the total number of the first ground warp yarn 21 included in the first and second subsets S1 and S2 could be equal to or greater than 6 or 8. Increased number of FDY facilitates that the bias is applied to the fastener tape. Furthermore, the strength of the first side-edge portion 11 is enhanced simultaneously. Note that, the second subset S2 possibly facing or touching the flange of the slider 4 would have a relatively higher resistance against wear owing to the FDYs. After the adhesion of the resin-made fastener elements 7 to the fastener tape 6, the regions R1 are covered by the resin-made fastener elements 7. Therefore, with respect to a fastener stringer in which the resin-made fastener elements 7 have adhered to the fastener tape 6, it would be possible to read with replacing the above-described region R1 with the resin-made fastener elements 7.

The plurality of first ground warp yarns 21 can include a third subset S3 of R (R indicating a natural number less than said P) yarns of the first ground warp yarn 21 in a region positioned away from the tape main portion 13 than the core cord 3. Increased number of FDY in the first side-edge portion 11 facilitates that the bias is applied to the fastener tape. Furthermore, the strength of the first side-edge portion 11 is enhanced simultaneously.

The woven structure of the first side-edge portion 11 may include a plain weave. In a case of plain weave, a relatively higher weave density is ensured, and a longer length of FDY per a unit length of fastener tape is ensured. In a case shown in FIG. 4, the plurality of first ground warp yarns 21 belonging to the first and second subsets S1 and S2 form a plain weave of 2/2 with the weft yarn 29. The two first ground warp yarns 21 pulled side-by-side extend to repeat crossing at the tape top side and crossing at the tape bottom side two pairs of weft yarn portions extending to opposite sides in the left-right direction. Note that the two first ground warp yarns 21 belonging to the third subset S3 forms a twill weave with the weft yarn 29.

The region of the tape main portion 13 adjacent to the first side-edge portion 11 is also a plain weave. In a case shown in FIG. 4, the plurality of second ground warp yarns 22 forms a plain weave of 1/1 with the weft yarn 29. Each of the second ground warp yarns 22 extends to repeat crossing at a tape top side and crossing at a tape bottom side a pair of weft yarn portions extending to opposite sides in the left-right direction.

Likewise the first ground warp yarn 21, FDYs including plant-derived resin are employed as component yarns of the core cord 3. For example, the core cord 3 includes one or more core yarns 3a and a plurality of sheath yarns forming a sheath layer 3b covering the one or more core yarns 3a. Both of the core yarn 3a and the sheath yarns are multifilament yarns and FDYs including plant-derived resin. Thermal shrinkage of the core cord facilitates that the bias is applied to the fastener tape.

The FDY of the core cord 3 can be a yarn having a same characteristic as the FDY of the first side-edge portion 11 (e.g. the first and the second subsets S1 and S2) such as a FDY produced through additional drawing of a common material of POY (Partially Oriented Yarn). The thermal shrinkage ratio of the FDY of the core cord 3 may be same as the thermal shrinkage ratio of the FDY of the first side-edge portion 11 (e.g. the first and second subsets S1 and S2), for example. Even in such an arrangement, a bias would be not excessively applied to the fastener tape if there were no difference in the thermal shrinkage ratio between the ground warp yarn of the first side-edge portion 11 and the ground warp yarn of the tape main portion 13. Again the FDY of the first ground warp yarn 21, the FDY of the core cord 3 and the FDY of the second ground warp yarn 22 are all multifilament yarns including plant-derived resin.

The FDY can be introduced in the second side-edge portion 12. As shown in FIG. 5, the second side-edge portion 12 includes a plurality of third ground warp yarns 23 each of which being FDY including plant-derived resin. When the first ground warp yarns 21 of the first side-edge portion 11 thermally shrink, the third ground warp yarns 23 of the second side-edge portion 12 also thermally shrink. This causes waves in the tape main portion 13 along the tape-elongation direction at an intermediate position between the first side-edge portion 11 and the second side-edge portion 12. The fastener tape 6 is sewn to a cloth of a garment by sewing yarn(s) at the tape main portion 13 where the waves are formed (e.g. at a sewing position P1 in FIG. 3), thus suppressing the formation of the above-discussed chain-puckering. Note that a DTY having a same characteristic as the second ground warp yarn 22 can be used for the fourth ground warp yarn 24 of the second side-edge portion 12.

Fastener stringer can be produced by weaving a fastener tape, thermally processing the fastener tape (e.g. heat-setting and dyeing), and performing an injection molding of resin-made fastener elements to the thermally-processed fastener tape. When the fastener tape is thermally processed, the first ground warp yarn 21 shrinks greatly than the second ground warp yarn 22. The first side-edge portion 11 is slightly shortened in the tape-elongation direction relative to the tape main portion 13. In such a way, the influence of stretching of the first side-edge portion 11 to be longer in the tape-elongation direction during the injection molding would be reduced. That is, the influence is reduced by allowing the first side-edge portion 11 to shrink to be shorter in advance, even if the first side-edge portion 11 is stretched to be longer in the tape-elongation direction during the injection molding.

It would be preferred to obtain FDY and DTY through different secondary processes from a common material of POY (Partially Oriented Yarn), and to use these FDY and DTY as the first and second ground warp yarns of the fastener tape respectively. This eliminates a need of procurement of yarns which are different in composition in order to obtain yarns which are different in thermal shrinkage ratio, facilitating reduction of material cost. This is particularly advantageous for plant-derived yarns with fewer selectable types.

In more detail, FDY may be obtained by drawing a common material of POY (Partially Oriented Yarn). In contrast, DTY is obtained through false-twisting of the common material of POY. The FDY obtained as noted above is used as the first ground warp yarn, and the DTY obtained as noted above is used as the second ground warp yarn. Of course, the FDY obtained as such may be used as the component yarns (the core yarn and/or the sheath yarn) of the core cord. Similarly, the DTY obtained as such may be used as the weft yarn.

Comparative Example

FIG. 6 (a) relates to a comparative example where all of the ground warp yarns in the fastener tape 6 are DTYs (See Chart 1). The engaged element portion 7' extends and meanders up and down along the front-rear direction in a condition where the slide fastener at the opening of the garment is closed. Note that the engaged element portion 7' is a portion formed of the engaged left and right resin-made fastener elements 7a and 7b and formed to be continuous frontward, as a result of frontward movement of the slider 4.

CHART 1

| Yarn | Material |
| --- | --- |
| First ground warp yarn | Multifilament DTY made of polyester |
| Second ground warp yarn | Multifilament DTY made of polyester |
| Third ground warp yarn | Multifilament DTY made of polyester |
| Core cord | Multifilament FDY made of polyester |

Working Example

FIG. 6 (b) relates to an example (See chart 2) in which the tape structure shown in FIGS. 4 and 5 is employed (that is, all of the ground warp yarns (the core cord included) in the first side-edge portion 11 are made of FDY, and 2 yarns at outer side are made of DTY and 2 yarns at inner side are made of FDY in the 4 yarns of the second side-edge portion 12, and all of the ground warp yarns in the tape main portion 13 are made of DTY). In this working example, the engaged element portion 7' extends without meandering up and down greatly (compared with FIG. 6(a)) along the front-rear direction while the slide fastener at the opening of the garment is closed, thus improving the chain-puckering. Note that the above-indicated FDY and DTY were produced through different secondary processes to the POYs of same composition, and were used as the ground warp yarns of the fastener tape. These FDYs were used not only for the ground warp yarns but also for the component yarns (core yarns and sheath yarns). This DTYs were used not only for the ground warp yarns but also for the weft yarn.

CHART 2

| Yarn | Material |
| --- | --- |
| First ground warp yarn | Multifilament FDY made of polyester |
| Second ground warp yarn | Multifilament DTY made of polyester |
| Third ground warp yarn | Multifilament FDY made of polyester |
| Core cord | Multifilament FDY made of polyester |

Based on the above teachings, a skilled person in the art would be able to add various modifications to the respective embodiments. Reference codes in Claims are just for reference and should not be referred for the purpose of narrowly construing the scope of claims. It is optional and not requisite to use FDY for all of the ground warp yarns in the first side-edge portion 11. Similarly, it is optional and not requisite to use DTY for all of the ground warp yarns in the tape main portion 13. In a case where DTY is introduced additionally to FDY in the first side-edge portion 11, the number of FDY would be greater than the number of DTY.

REFERENCE CODES

3 Core cord
6 Fastener tape
11 First side-edge portion
12 Second side-edge portion
13 Tape main portion
21 First ground warp yarn
22 Second ground warp yarn

The invention claimed is:

1. A fastener tape (6) in which a weft yarn and every ground warp yarn are yarns including plant-derived resin, the fastener tape (6) comprising:
a first side-edge portion including a core cord and a plurality of first ground warp yarns; and
a tape main portion adjacently positioned to the first side-edge portion and including a plurality of second ground warp yarns, wherein
a thermal shrinkage ratio of the first ground warp yarn is greater than a thermal shrinkage ratio of the second ground warp yarn in accordance with a difference in yarn type between the first ground warp yarn and the second ground warp yarn, the first ground warp yarn being FDY (Fully Drawn Yarn) and the second ground warp yarn being DTY (Drawn Textured Yarn).

2. The fastener tape of claim 1, wherein said FDY and said DTY are ones secondary processed from yarns of same composition.

3. The fastener tape of claim 1, wherein $0.5<(T2/T1)<0.8$ is satisfied, where T1 indicates the thermal shrinkage ratio of the first ground warp yarn in percent and T2 indicates the thermal shrinkage ratio of the second ground warp yarn in percent.

4. The fastener tape of claim 1, wherein the plurality of first ground warp yarns includes a first subset and a second subset,
the first subset including P (P indicating a natural number equal to or greater than 3) yarns of the first ground warp yarns and located in a region closer to the tape main portion than the core cord, and
the second subset including Q (Q indicating a natural number less than said P) yarns of the first ground warp yarns and located in a region closer to the tape main portion than the first subset, and wherein
the first subset is arranged to cross regions to which resin-made fastener elements adhere,
the second subset is interposed between said adhesion regions and the tape main portion.

5. The fastener tape of claim 4, wherein said P indicates a natural number equal to or greater than 4, and said Q indicates a natural number equal to or less than 3.

6. The fastener tape of claim 4, wherein the plurality of first ground warp yarns includes a third subset including R (R indicating a natural number less than said P) yarns of the first ground warp yarns and located in a region farther from the tape main portion than the core cord.

7. The fastener tape of claim 1, wherein the first side-edge portion includes no DTY (Drawn Textured Yarn).

8. The fastener tape of claim 1, wherein the core cord includes a FDY (Fully Drawn Yarn) including plant-derived resin.

9. The fastener tape of claim 1, wherein the core cord includes one or more core yarns and a plurality of sheath yarns forming a sheath layer to cover the one or more core yarns, both of the core yarn and the sheath yarn being FDY (Fully Drawn Yarn) including plant-derived resin.

10. The fastener tape of claim 1, further comprising:
a second side-edge portion arranged opposite to the first side-edge portion, the second side-edge portion including a plurality of third ground warp yarns, each of the plurality of third ground warp yarns being FDY (Fully Drawn Yarn) including plant-derived resin.

11. A method of producing a fastener stringer, the method comprising:
weaving a fastener tape;
thermally processing the fastener tape; and
performing injection-molding of resin-made fastener elements to the thermally-processed fastener tape, wherein
the fastener tape is a faster tape in which a weft yarn and every ground warp yarn are yarns including plant-derived resin;
the fastener tape comprises a first side-edge portion including a core cord and a plurality of first ground warp yarns, and a tape main portion adjacently positioned to the first side-edge portion and including a plurality of second ground warp yarns; and
when the fastener tape is thermally processed, the first ground warp yarn shrinks more than the second ground warp yarn in accordance a difference in yarn type between the first ground warp yarn and the second ground warp yarn, the first ground warp yarn being FDY (Fully Drawn Yarn) and the second ground warp yarn being DTY (Drawn Textured Yarn).

12. The method of producing a fastener stringer of claim 11, wherein the plurality of first ground warp yarns includes a first subset and a second subset,
the first subset including P (P indicating a natural number equal to or greater than 3) yarns of the first ground warp yarns and located in a region closer to the tape main portion relative to the core cord, and
the second subset including Q (Q indicating a natural number less than said P) yarns of the first ground warp yarns and located in a region closer to the tape main portion relative to the first subset, and wherein
the first subset is arranged to cross regions to which the resin-made fastener elements adhere,
the second subset is arranged in a position to which resin-made fastener element does not adhere.

13. A fastener tape comprising:
a first side-edge portion including a core cord and a plurality of first ground warp yarns; and
a tape main portion adjacently positioned to the first side-edge portion and including a plurality of second ground warp yarns, wherein
a thermal shrinkage ratio of the first ground warp yarn is greater than a thermal shrinkage ratio of the second ground warp yarn in accordance with a difference in yarn type between the first ground warp yarn and the second ground warp yarn, the first ground warp yarn being FDY (Fully Drawn Yarn) and the second ground warp yarn being DTY (Drawn Textured Yarn).

14. The fastener tape of claim 13, wherein each first ground warp yarn of said plurality of first ground warp yarns consists of plant-derived resin, and each second ground warp yarn of said plurality of second ground warp yarns consists of plant-derived resin.

15. The fastener tape of claim 14, wherein the core cord consists of plant-derived resin.

16. The fastener tape of claim 14, wherein a weft yarn of the fastener tape consists of plant-derived resin.

17. The fastener tape of claim 14, further comprising:
a second side-edge portion arranged opposite to the first side-edge portion, the second side-edge portion including a plurality of third ground warp yarns, each of the plurality of third ground warp yarns being FDY (Fully Drawn Yarn) including plant-derived resin.

* * * * *